United States Patent
Galbraith

[19]

[11] Patent Number: 6,095,595
[45] Date of Patent: Aug. 1, 2000

[54] MOLDED AIR DUCT WITH INTEGRAL ATTACHMENT MEMBER

[75] Inventor: Michael Carl Galbraith, Westland, Mich.

[73] Assignee: Ford Motor Company, Dearborn, Mich.

[21] Appl. No.: 09/248,356

[22] Filed: Feb. 10, 1999

[51] Int. Cl.[7] ............................ B60K 11/00; B60K 37/00
[52] U.S. Cl. .................. 296/208; 296/190.09; 138/106; 411/508
[58] Field of Search ...................... 454/143, 145; 296/190.09, 208; 138/106, 107; 248/74.2, 221.11, 221.12, 222.11, 222.41, 225.11; 411/508, 509, 913

[56] References Cited

U.S. PATENT DOCUMENTS

| | | | |
|---|---|---|---|
| 1,538,789 | 5/1925 | Flemming | 428/99 |
| 4,725,463 | 2/1988 | Baumber et al. | 428/33 |
| 5,263,893 | 11/1993 | Hoffman et al. | 454/69 |
| 5,367,751 | 11/1994 | De Witt | 24/295 |
| 5,453,309 | 9/1995 | Shanok et al. | 428/31 |
| 5,591,078 | 1/1997 | Filion et al. | 454/124 |
| 5,622,402 | 4/1997 | Pritchard et al. | 296/191 |
| 5,678,877 | 10/1997 | Nishijima et al. | 296/70 |
| 5,706,170 | 1/1998 | Glovatsky et al. | 361/695 |
| 5,716,161 | 2/1998 | Moore et al. | 403/406.1 |
| 5,816,543 | 10/1998 | Kraus | 248/73 |
| 5,851,097 | 12/1998 | Shereyk et al. | 411/508 |
| 5,979,965 | 4/1999 | Nishijima et al. | 296/70 |
| 5,997,078 | 12/1999 | Beck et al. | 296/208 |

FOREIGN PATENT DOCUMENTS 2921956  12/1980  Germany.

*Primary Examiner*—D. Glenn Dayoan
*Assistant Examiner*—Patricia L. Engle
*Attorney, Agent, or Firm*—Leslie C. Hodges; Roger L. May

[57] ABSTRACT

An apparatus for directing conditioned air into a vehicle passenger compartment including an integrally formed attachment member for securing the apparatus to a vehicle support structure. The attachment member has a flexible free end, an elongated body, an aperture, and a plurality of living hinges. The elongated body is inserted into a vehicle support structure aperture. The elongated body is then folded onto itself until the flexible free end is able to be inserted into locked engagement with the aperture in the elongated body. Thus, the present invention minimizes the cost of the apparatus, the number of parts, assembly time and complexity.

8 Claims, 2 Drawing Sheets

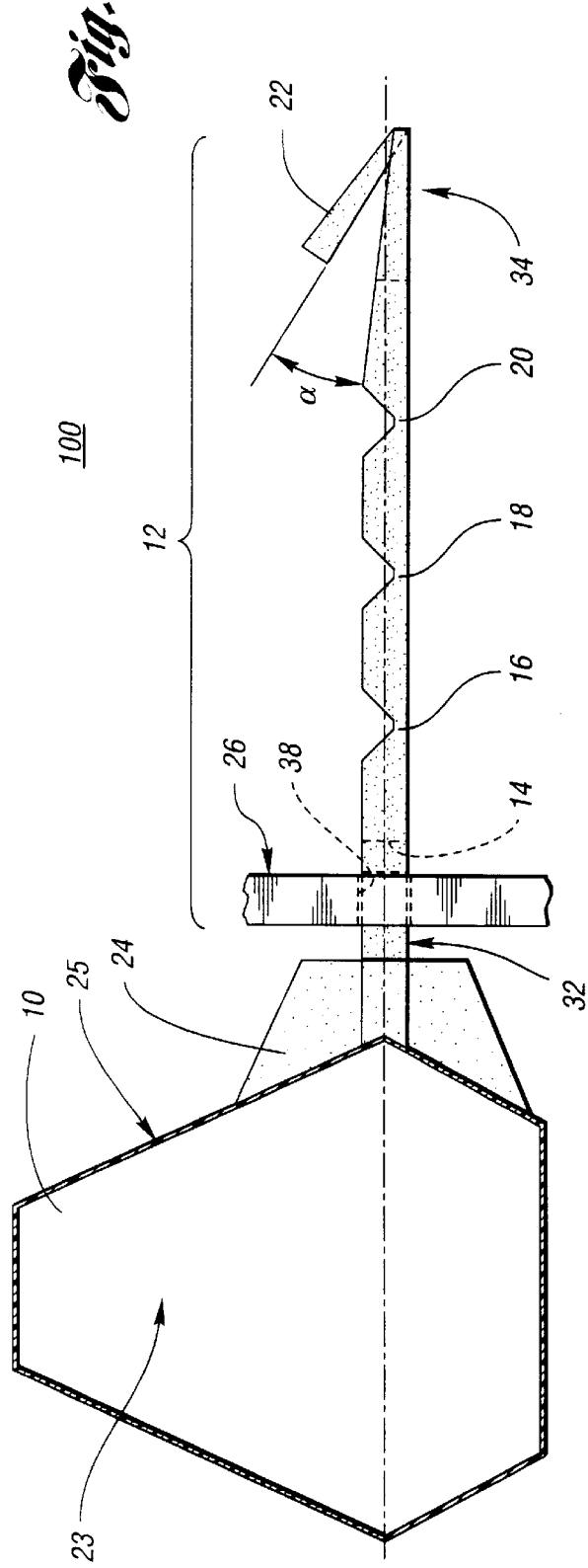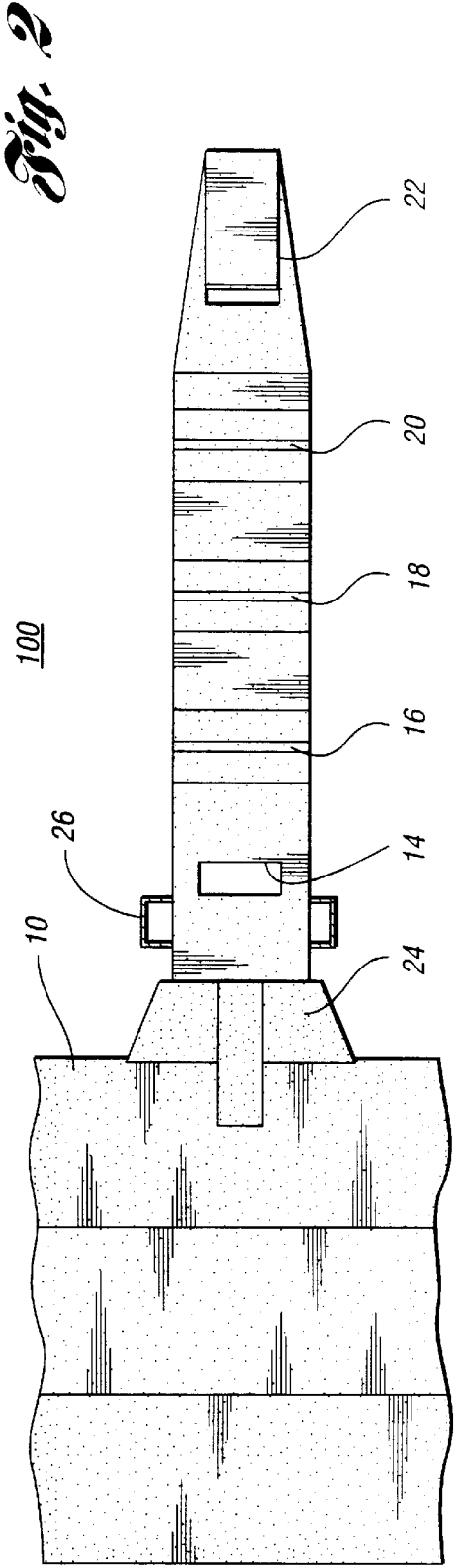

MOLDED AIR DUCT WITH INTEGRAL ATTACHMENT MEMBER

TECHNICAL FIELD

The present invention relates to molded air conditioning ducts for automotive vehicles and, more particularly, to an improved molded air duct which does not require separate mechanical fasteners.

BACKGROUND ART

Molded air ducts are well known in the art and are located in vehicle instrument panels for directing conditioned air into a passenger compartment. Typically, molded air ducts contain a plurality of attachment points which require mechanical fasteners, such as push pins or clips made from plastic or metal, to secure the air duct to the vehicle structure.

However, the use of mechanical fasteners undesirably require that additional parts be used during air duct assembly, thus adding to the overall cost of the assembly. Assembly cost is further impacted because use of the mechanical fasteners increases the complexity and time required to assemble the components.

Accordingly, there is presently a need for a molded air duct that can be easily and inexpensively manufactured. Further, the air duct should provide a simple and quick method for attachment to a vehicle structure.

SUMMARY OF THE INVENTION

Therefore, it is an objective of the present invention to provide an apparatus and method for attaching a molded air duct to a vehicle structure while reducing the number of parts in the apparatus by integrally forming an attachment member as part of the air duct molding to form a one-piece construction.

In accordance with the invention, a molded air duct apparatus for directing air in a vehicle air conditioning system includes an air duct and an attachment member. More specifically, the molded air duct has a wall member which includes an inner surface that defines a passage for containing and distributing conditioned air into the vehicle passenger compartment and an outer surface. The attachment member has an integrally molded end attached to the outer surface and a free end for removably engaging a vehicle structure to attach the air duct to the vehicle support structure.

The above object and other objects, features, and advantages of the present invention are readily apparent from the following detailed description of the best mode for carrying out the invention when taken in connection with the accompanying drawings.

BRIEF DESCRIPTION OF DRAWINGS

FIG. 1 is a side view of a molded air duct with an integral attachment member in accordance with the present invention;

FIG. 2 is a plan view of the attachment member in accordance with the present invention;

BEST MODE FOR CARRYING OUT THE INVENTION

Figure 3:
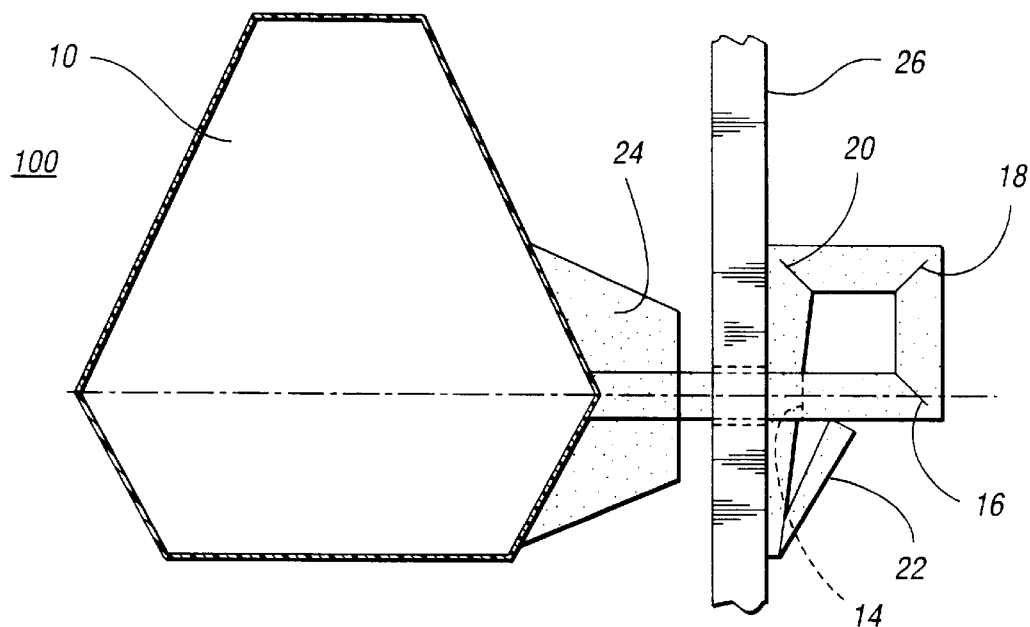
FIG. 3 is a side view of the molded air duct secured to a vehicle support structure with the integral attachment member shown in a locked position, in accordance with the present invention.

Referring now to FIG. 1, an exemplary embodiment 100 of an air duct 10 with an attachment member 12 is shown in an unlocked position, according to the present invention. The air duct 10 includes a wall portion 25 which defines an air passage 23 for receiving, distributing, and directing conditioned air into the vehicle passenger compartment. The attachment member 12 has an attached end 32 and a free end 34 and includes a plurality of living hinges 16, 18 and 20, an aperture 14, and a flexible tab 22. The attached end 32 is fixedly secured to air duct 10 by a standoff 24. The standoff 24 provides attachment spacing between the air duct 10 and a vehicle support structure (not shown). The flexible tab 22 is located at the free end 34.

With continuing reference to FIG. 1, the flexible tab 22 is raised by an angle a with respect to the rest of the attachment member 12. Further, the flexible tab 22, is flexibly rotatable from a fully unflexed position as shown in FIG. 1 through the angle α to a fully flexed position. In the fully flexed position, the flexible tab 22 is sized accordingly to be receivable in the aperture 14 (seen in FIGS. 2 and 3).

Referring now to FIG. 2, a detailed top view of the molded air duct apparatus 100 is shown, according to the present invention. Aperture 14 is located proximate to the standoff 24. The plurality of hinges 16, 18 and 20 are located between the aperture 14 and the flexible tab 22. The living hinges 16, 18 and 20 allow the attachment member 12 to bend back onto itself allowing the flexible tab 22 to be received into the aperture 14.

Referring now to FIG. 3, the molded air duct apparatus 100 with the attachment member 12 is shown in a locked position, according to the present invention. In operation, blow-molded air duct apparatus 100 is secured to the vehicle structure 26 by inserting the attachment member 12 through an aperture 38 in the vehicle structure 26. The attachment member 12 is then bent at the living hinges 16, 18 and 20, until the flexible tab 22 reaches the aperture 14. The flexible tab 22 is then pushed through the aperture 14 until the flexible tab 22 rebounds to the unflexed position as shown in FIG. 3.

With continuing reference to FIG. 3, aperture 14 is appropriately sized to accept the flexible tab 22 when the flexible tab 22 is fully flexed. The juxtaposition of the flexible tab 22 within the aperture 14 creates an interference condition between the attachment member 12 and the flexible tab 22. The interference condition prevents the molded air duct apparatus 100 from becoming disengaged from the vehicle support structure 26. The molded air duct apparatus 100 may be secured at any location along the vehicle support structure 26 where an aperture is provided. The flexible tab 22 is locked in place when the flexible tab 22 is pushed through the aperture 14 and rebounds to its fully unflexed position. The flexible tab 22 is only removable by compressing the flexible tab 22 to the fully flexed position and then pushing the flexible tab 22 back through the aperture 14.

With continuing reference to FIG. 3, the attachment member 12 is integrally attached to the molded air duct 10 by including in a molding cavity (not shown) a feature for creating the attachment member 12. These features may be added to the mold cavity by customary methods well known in the art of mold manufacturing. A plurality of attachment members 12 and standoffs 24 may be located along the molded air duct 10 for securing the molded air duct 10 to various vehicle support structures.

For example, the molded air duct apparatus 100 may be manufactured by blow-molding the air duct 10 to create the air passage 23 and compression molding the attachment member 12 simultaneously. The result is a molded air duct with an integrally molded attachment member with a negligible increase in material costs, a reduction in assembly labor costs and a minimal expense to modify the molded air duct cavity mold.

Figure 4:
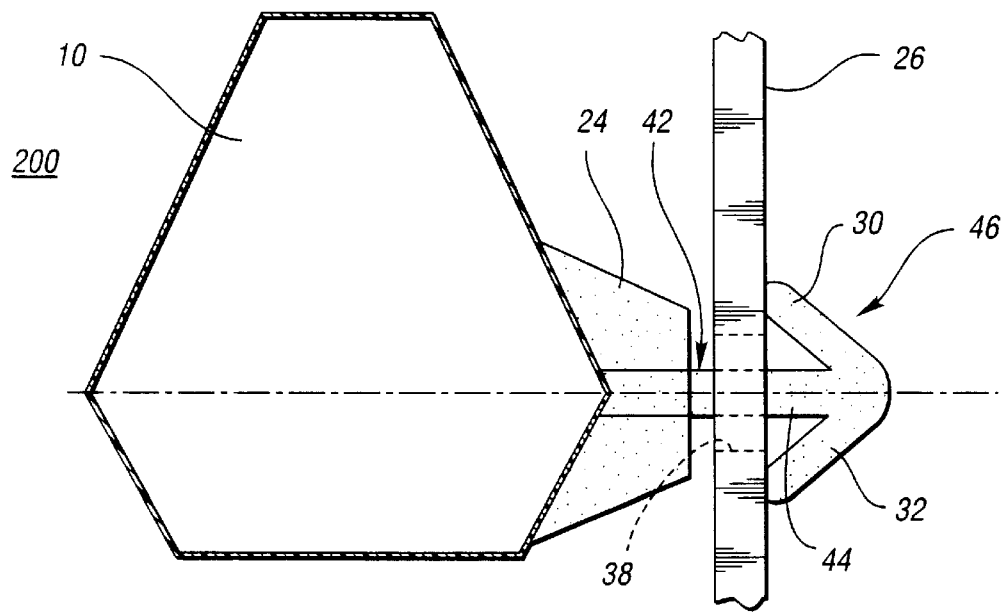
FIG. 4 is a side view of an alternative embodiment of the molded air duct and the attachment member in a secured and locked position with respect to the vehicle support structure, in accordance with the present invention.

Referring now to FIG. 4, an alternative embodiment of the present invention is illustrated. Molded air duct apparatus 200 has a molded air duct 10 and an integrally formed attachment member 44. The attachment member 44 includes a fixed end 42 and a free end 46. The free end 46 has flexible tabs 30 and 32 which engage a vehicle support structure 26 and hold the molded air duct apparatus 200 in a fixed position relative to vehicle structure 26. In the instant embodiment, the vehicle support structure 26 includes an aperture 38. The aperture 38 is adapted to receive attachment member 44.

In operation, attachment member 44 is pushed through the aperture 38 until flexible tabs 30 and 32 clear the aperture 38. As in the previously described embodiment, attachment member 44 is integrally attached to the mold air duct 10 by adding features to the air duct mold which create the attachment member 44. Having attachment member 44 integrally molded to the molded air duct 10 eliminates the need for additional fasteners. Also, integral fasteners such as attachment member 44 make assembly of molded air duct 10 into the vehicle support structure 26 easier and less expensive.

While the best mode for carrying out the invention has been described in detail, those familiar with the art to which this invention relates will recognize various alternative designs and embodiments for practicing the invention as defined by the following claims.

What is claimed is:

1. A molded air duct apparatus for directing conditioned air into a vehicle passenger compartment, the molded air duct apparatus comprising:

an air duct housing molded to provide a cavity for containing and distributing conditioned air into the vehicle passenger compartment; and an attachment member integrally molded with the air duct housing so as to project outwardly there from, the attachment member having a flexible free end arranged to bend about itself into a locked position after insertion into a vehicle support structure to provide attachment of the molded air duct housing to the vehicle support structure.

2. The apparatus of claim 1, wherein the apparatus further comprises a standoff integrally molded to the air duct housing and disposed between the cavity and the attachment member.

3. The apparatus of claim 1, wherein the flexible free end comprises at lease one flexible tab for locking the attachment member into engagement with the vehicle support structure.

4. The apparatus of claim 1, wherein the attachment member further comprises: an elongated body, and an aperture in the elongated body located between the air duct housing and the flexible free end for receiving the flexible free end, thereby creating an interference fit between the aperture and the flexible free end, wherein the elongated body is arranged to bend allowing the free end to lockably engage the aperture.

5. The apparatus of claim 4, wherein the attachment member comprises: a plurality of living hinges formed as part of the elongated body and disposed between the air duct housing and the flexible free end providing flexible movement of the flexible free end toward the aperture.

6. A molded air duct apparatus for directing conditioned air into a vehicle passenger compartment, the molded air duct apparatus comprising:

an air duct housing molded to provide a cavity for containing and distributing conditioned air into the vehicle passenger compartment; and an attachment member integrally molded with the air duct housing so as to project outwardly there from, the attachment member having a flexible free end, wherein the flexible free end comprises at least one flexible tab for lockably engaging a vehicle support structure to provide attachment of the air duct housing to the vehicle support structure.

7. The apparatus of claim 6, wherein the flexible free end comprises flexible tabs for lockably engaging the vehicle structure, each flexible tab extending radially from the flexible free end.

8. The apparatus of claim 6, wherein the apparatus further comprises a standoff integrally molded to the air duct housing and disposed between the cavity and the attachment member.

* * * * *